United States Patent [19]

Segrist

[11] Patent Number: 4,824,650

[45] Date of Patent: Apr. 25, 1989

[54] METHOD FOR EXTRACTING ARSENIC AND HEAVY METALS FROM PHOSPHORIC ACID

[76] Inventor: Lloyd E. Segrist, 5110 N. Lawn, Kansas City, Mo. 64119

[21] Appl. No.: 235,208

[22] Filed: Aug. 23, 1988

[51] Int. Cl.$^4$ .............................................. C01B 25/16
[52] U.S. Cl. ............................. 423/321 R; 423/321 S
[58] Field of Search ................. 423/320, 321 R, 321 S

[56] References Cited

U.S. PATENT DOCUMENTS

| | | | |
|---|---|---|---|
| 1,777,548 | 10/1930 | Booth | 423/321 R |
| 1,787,192 | 12/1930 | Fiske | 423/321 R |
| 4,668,492 | 5/1987 | Schimmel et al. | 423/321 R |
| 4,769,226 | 9/1988 | Winard et al. | 423/321 R |

OTHER PUBLICATIONS

Selected Process Industries, 1950, R. N. Shreve, McGraw-Hill, pub.
Phosphoric Acid vol. 1, Part II, 1968, A. V. Slack; Marcel Dekker, Inc., pub.
Chemical Technology: An Encyclopedia Treatment, vol. 1, 1968, Dr. J. F. Van/Oss, Barnes & Nobles, Inc., pub.
Faith, Keyes, and Clark's Industrial Chemicals, 4th Ed., 1975, pp. 628–638, F. A. Lowenheim, M. K. Moran; John Wiley & Sons, Inc., pub.
Kirk-Othmer Encyclopedia of Chemical Technology, A Wiley-Interscience Publication, John Wiley & Sons, Inc., 3rd Ed., vol. 17, pp. 437–441, R. B. Hudson & M. J. Dolon, authors.

*Primary Examiner*—Gregory A. Heller
*Attorney, Agent, or Firm*—Hovey, Williams, Timmons & Collins

[57] ABSTRACT

An improved, low cost, liquid extraction method for significantly reducing the arsenic and other heavy metal content of phosphoric acid is disclosed which can routinely achieve essential elimination of arsenic compounds while producing relatively small amounts of usable heavy metal by-product. Preferably, the impure acid (wet process or furnace grade having a $P_2O_5$ content of about 50–65%) is initially sulfided at elevated temperatures to form arsenic and other heavy metal sulfides, whereupon the sulfided acid is allowed to set and cool; a liquid extractant, preferably carbon disulfide, is then added with agitation and subsequent setting, to form easily separable phosphoric acid and heavy metal-bearing fractions. Residual extractant can be removed from the separated acid by oxidation, leaving phosphoric acid having a very low arsenic content.

23 Claims, No Drawings

METHOD FOR EXTRACTING ARSENIC AND HEAVY METALS FROM PHOSPHORIC ACID

BACKGROUND OF THE INVENTION

1. Field of the Invention

The present invention is broadly concerned with an improved, low cost method for removal of arsenic and other heavy metals from phosphoric acid in order to obtain a greatly purified product. More particularly, it is concerned that such a method which involves, inter alia, a liquid extraction of heavy metal sulfides, preferably through the use of carbon disulfide as an extractant.

2. Description of the Prior Art.

Phosphoric acid is produced on a commercial scale by two methods, namely the furnace process and the wet process. Furnace acid is generally purer than wet process acid (the latter sometimes being referred to as "green acid"), but is significantly more costly to produce. Indeed, furnace grade acid generally is designed for a more specialized market requiring a high degree of purity.

Both types of phosphoric acid generally contain as contaminants heavy metals, and particularly arsenic, lead, copper, and bismuth. Arsenic makes up the very large majority of heavy metal species in most phosphoric acids. These contaminants typically exist in the phosphate ore used as a starting material, and are carried through both commercial processes, thus becoming contaminants in the final acids. The typical concentration of heavy metals in furnace grade acid is from about 50–200 ppm, depending upon the quality of ore employed.

Heavy metal contaminants, and particularly arsenic are very undesirable in phosphoric acid, particularly acids destined for the food grade market. As a consequence, producers of high quality acid take steps to remove the heavy metal contaminants during processing. Almost without exception, such heavy metals are removed by a sulfide treatment of the acid, involving reacting the acid with hydrogen sulfide or a sulfide salt such as sodium sulfide. The resulting heavy metal sulfides tend to form a very fine particulate suspension in the liquid acid, which can be extremely difficult to remove. Accordingly, processors make use of filter aids such as diatomacous earth, perlite, or bentonite clay, which increase filtration retention and/or throughput. Consequently, the filter aids are removed with the heavy metal sulfides as a filter cake.

While the above-described process is capable of lowering the heavy metal content of phosphoric acid to less than 10 ppm (with an arsenic content of less than 3 ppm), the resultant filter cake is considered a hazardous waste, and therefore disposal of the filter cake can be very difficult and expensive. At the same time, the filter cake tends to have considerably greater volume than what would be predicted by the stochiometry of the overall process as it contains phosphoric acid, water, and filter aids in addition to the heavy metal sulfides.

Accordingly, there is a real and heretofore unsatisfied need in the art for an improved process for removing heavy metal contaminants (and especially arsenic) from wet or furnace grade acid which eliminates or at least minimizes the disposal problems inherent in the use of conventional filtering aids.

SUMMARY OF THE INVENTION

The present invention overcomes the problems outlined above and provides a process for removing arsenic and other heavy metals from phosphoric acid through the use of a liquid extractant/gravimetric technique which is capable of removing virtually all offending contaminants while at the same time largely reducing the waste disposal problem inherent in prior processes.

In general, the process of the invention comprises the steps of contacting a heavy metal-containing phosphoric acid with a sulfiding agent (e.g., hydrogen sulfide or sodium sulfide) and a liquid extractant. The sulfiding agent serves to react with the heavy metals and form sulfides thereof, while the extractant serves to sequester the heavy metal sulfides. The final step of the process involves recovery of phosphoric acid, typically through the use of centrifugation and gravimetric separation.

In preferred forms, the sulfiding agent and extractant are added in a stepwise fashion, i.e., the starting acid is initially sulfided with an intermediate settling step, followed by treatement with an extractant, and ultimate separation. Alternately, the sulfiding agent and extractant can be premixed prior to addition to the phosphoric acid, but this procedure is not preferred.

The process of the invention is applicable to all types of phosphoric acid, for example furnace grade and wet process phosphoric acids. In addition, although the process can be used with acids having a wide variety of $P_2O_5$ contents, it is preferred that the acid have from about 50 to 65% $P_2O_5$. At lower $P_2O_5$ contents, the specific gravities of the acid and preferred extractant (carbon disulfide) are similar, thus presenting difficulties in separation; with extremely high $P_2O_5$ content acid, the viscosity of the acid presents handling problems.

DESCRIPTION OF THE PREFERRED EMBODIMENTS

The initial step of the preferred process of the invention involves sulfiding heavy metal-containing phosphoric acid in order to produce heavy metal sulfides, particularly arsenic sulfide. Advantageously, the sulfiding step is carried out at an elevated temperature of from about 50° to 90° C. and can involve sparging gaseous hydrogen sulfide into the liquid acid (typically carried out with moderate mechanical agitation over a period of from about 1–4 hours) or addition of a sulfiding salt. The preferred sulfiding agents are selected from the group consisting of hydrogen sulfide, the alkali metal sulfides, and phosphorous pentasulfide.

After the sulfiding agent has been added to the acid, and the intial reaction complete, it is desirable to allow the initially sulfided acid to set for a period of up to about 16 hours, more preferably from about 15 minutes to about 3 hours. During this time, it is also desirable to permit the acid to drop in temperature to approximately ambient or more broadly from about 20° to 40° C. Such lowered temperatures eliminate the possibility of boil-off of the extractant when subsequently added to the acid.

The extraction step involves addition of a minor amount of liquid extractant to the initially sulfided acid, with sufficient agitation to assure an even dispersion. The preferred extractant is liquid carbon disulfide, and this agent should be added to the acid at a level sufficient to effect (upon setting) separation into a phosphoric acid fraction and an arsenic compound-bearing fraction. The carbon disulfide may be added at a level of up to about 10% by weight of the initially sulfided phosphoric acid, although this would typically be greatly in excess of the requirements. This presents no difficulty, however, inasmuch as the excess carbon disulfide can readily be recovered by distillation.

After the extractant is added with sufficient agitation, the mixture is allowed to settle. During this process, the extractant tends to agglomerate or sequester the heavy metal sulfides in the acid, and distinct layers form in the reaction vessel. The lower fraction is primarily phosphoric acid, followed by a heavy metal sulfide layer and a layer primarily comprising carbon disulfide. In the preferred form of the invention, the specific gravity differences between the materials leads to rather prompt separation of the materials. If desired though, steps can be made to enhance the separation time, e.g., centrifugation. In any event, the setting time required is variable depending upon reaction conditions but generally varies from between about 15 minutes and 16 hours.

The final separation step is of course conventional and involves merely decanting the upper layers or draining of the lower layer in order to effect the necessary separation of the acid. It may occur that the decontaminated acid contains a small fraction of carbon disulfide therein. This can be readily removed by oxidation, which may involve passing air into the acid or the addition of a minor amount of hydrogen peroxide followed by heating to a level of about 70°-100° C. This treatment serves to render the acid clear and odor free. Actual experiments using the process of the invention demonstrate that the arsenic level in the treated acid is very low, usually under 1 ppm.

In order forms of the invention, the extraction process may be enhanced by the addition of 1 part diatomaeous earth to 1 part heavy metal sulfide content in the acid subsequently to the initial sufiding step. The diatomaceous earth may be added during the sulfiding step to good advantage. This modification renders the overall process more rapid, since extraction can proceed as soon as the proper temperature levels are reached.

In another alternative, very good results can be obtained by the addition of a strongly acid cationic surfactant or flocculating agent to the initially sulfided acid. Here again, this permits the processor to begin the extraction step as soon as the acid reaches the desired temperature.

The followin examples illustrate the principles of the invention.

EXAMPLE 1

The starting material for this example was a 84% $P_2O_5$ polyphosphoric furnace grade acid solution. the acid solution had a reported analysis of 120 ppm arsenic content. Subsequent analysis (colorimetric analysis by reduction of the arsenic species in the acid and recovery of the resulting $AsH_3$ in pyridine) revealed a minimum arsenic content of 100 ppm. The 84% $P_2O_5$ polyphosphoric acid was diluted down to 54% strength phosphoric acid and verified by hydrometer.

20 mililiters of the 54% $P_2O_5$ phosphoric acid was placed into a test tube, and several pellets of sodium sulfide were then added. By vigorously shaking the test tube of acid and at the same time relieving the buildup of gas pressure (hydrogen sulfide), the acid was crudely sulfided at room temperature in a matter of several minutes. The sulfided acid was then split into two 10 mililiter samples in separate test tubes. The acid samples were allowed to set overnight undisturbed (16 hours).

After setting, one of the initially sulfided acid samples was filtered through a 10 micron retention fretted glass filter. The resulting cake was of a yellowish-green color. The 54% $P_2O_5$ acid filtrate was perfectly clear. Subsequent analysis of the acid filtrate revealed a 20 ppm arsenic content.

2 mililiters of carbon disulfide was added to the second acid sample. This was vigorously shaken for 15 seconds and then allowed to settle for 30 minutes. The upper yellowish-green layer of carbon disulfide was decanted off to leave a slightly yellowish 54% $P_2O_5$ acid raffinate. Subsequent analysis of the acid revealed a 22 ppm arsenic content.

EXAMPLE 2

In this example an improved sulfiding technique was employed. The procedure of Example 1 was repeated with the exception of the sulfiding operation. In this case, a hydrogen sulfide generator was constructed (dropwise addition of sulfuric acid into a flask of sodium sulfide solution). The evolved hydrogen sulfide gas was routed into the test tube of 54% $P_2O_5$ acid and allowed to sparge through it for 2 hours, while maintaining the acid solution at 70° C. (in a hot water bath). Filtered and carbon disulfide extracted samples yielded 1.0 ppm and 1.0 ppm arsenic contents in their respective acids.

EXAMPLE 3

This test repeats the procedure of Example 2, but shortens the time the acid is allowed to set after sulfiding from 16 hours to 15 minutes. Arsenic contents of both the filtered and carbon disulfide extracted acid rose to 4 ppm and 5 ppm arsenic respectively. The initially sulfided sample of 54% $P_2O_5$ strength acid that was to be extracted had to be cooled to room temperature (by running cold water over the outside of the test tube) before the carbon disulfide could be added, in order to prevent boil off of the carbon disulfide.

EXAMPLE 4

The following illustrates a preferred method in accordance with the invention. 100 mililiters of 54% $P_2O_5$ strength phosphoric acid with a known 80 ppm arsenic content was placed in a 250 mililiter Erlenmeyer flask, kept at 70° C. in a hot water bath. The acid was sparged with hydrogen sulfide gas for 2 hours under moderate mechanical agitation. The flask was then removed from the bath and allowed to cool to room temperature over a period of 3 hours. The initially sulfided acid was poured into a 250 mililiter separatory funnel, and 5 mililiters of carbon disulfide added. The separatory funnel was then vigorously shaken for 1 minute and allowed to set for 15 minutes. After 15 minutes the bottom yellowish tinted acid layer was removed by opening the stopcock at the bottom of the funnel. The tinted 54% $P_2O_5$ strength phosphoric acid was then treated with 1 mililiter of 30% hydrogen peroxide and heated to 90° C. to oxidize out traces of carbon disulfide, colloidal sulfur, hydrogen sulfide, etc. Within 10 minutes, the acid solution became clear and odor free. The arsenic content of this treated acid was 0.5 ppm.

EXAMPLE 5

In this test, the procedure of Example 4 was followed, but the sensitivity of the extraction method with surfactant addition was tested.

The addition of 5 ppm by weight of Nacconal 40DB, an anionic linear alkylate sulfonate surfactant, was found to inhibit the extraction method. However, the addition of 5 ppm Amerfloc 490, a cationic polymer sold by Drew Chemical Corporation, 1 Drew Chemical Plaza, Boonton, N.J., 07005, enhanced the separation of the carbon disulfide suspension with arsenic sulfide from the phosphoric acid. The cationic polymeric surfactant was added to the sulfided acid before adding the carbon disulfide.

Using this method, it was possible to reduce the separation time from 15 minutes (Example 4) to 10 minutes and still maintain the same low arsenic content (0.5 ppm) of the final product sold.

EXAMPLE 6

In another test using the procedure of Example 4, the addition of a small amount of diatomaceous earth filter aid (Eagle Pitcher FW-12) was found to enhance the separation of the carbon disulfide/arsenic sulfide layers from the phosphoric acid. Again, it was possible to reduce the separation time from 15 minutes (Example 4) to 10 minutes by the addition of 80 ppm of filter aid to the sulfided acid prior to the addition of carbon disulfide. The same low arsenic content (0.5 ppm) in the final product acid was the result.

I claim:

1. A method of removing heavy metals from phosphoric acid, comprising the steps of contacting said phosphoric acid with a sulfiding agent and a liquid extractant, said sulfiding agent serving to react with said heavy metals and form sulfides thereof, and said extractant comprising carbon disulfide and serving to sequester said heavy metal sulfides, and thereafter recovering phosphoric acid.

2. The method of claim 1, including the step of premixing said sulfiding agent and extractant prior to said contacting step.

3. The method of claim 1, including the step of initially treating said acid with said sulfiding agent, and thereafter treating the initially sulfided acid with said liquid extractant.

4. The method of claim 3, including the step of allowing said initially sulfided acid to set for a period of up to about 16 hours, prior to said liquid extraction.

5. The method of claim 3, said liquid extraction being carried out with said acid at a temperature of from about to 20° to 40° C.

6. The method of claim 1, said acid having a $P_2O_5$ content of from about 50 to 65%.

7. The method of claim 1, said sulfiding agent being selected from the group consisting of hydrogen sulfide, the alkali metal sulfides, and phosphorous pentasulfide.

8. In a method of removing heavy metals from phosphoric acid including the step of initially sulfiding the phosphoric acid, the improvement which comprises the steps of treating the initially sulfided phosphoric acid with carbon disulfide, and recovering phosphoric acid.

9. The method of claim 8, including the steps of allowing said carbon disulfide treated phosphoric acid to settle and form a phosphoric acid fraction and a heavy metal-bearing fraction, and separating said fractions.

10. The method of claim 9, including the step of treating said phosphoric acid fraction with an oxidizing agent to remove any traces of carbon disulfide therefrom.

11. The method of claim 10, said oxidizing agent being hydrogen peroxide.

12. The method of claim 8, said carbon disulfide treating step being carried out with said initially sulfided acid being at a temperature of from about 20° to 40° C.

13. The method of claim 8, said sulfiding step comprising contacting said phosphoric acid with a sulfiding agent selected from the group consisting of hydrogen sulfide, the alkali metal sulfides, and phosphorous pentasulfide.

14. The method of claim 8, said sulfiding step being carried out with said phosphoric acid being at a temperature of from about 50° to 90° C.

15. The method of claim 8, said carbon disulfide being in the form of a liquid.

16. The method of claim 8, said phosphoric acid being wet process phosphoric acid.

17. The method of claim 8, said phosphoric acid being furnace grade phosphoric acid.

18. The method of claim 8, said phosphoric acid having a $P_2O_5$ content of from about 50 to 65%.

19. The method of claim 8, said carbon disulfide being added to said initially sulfided phosphoric acid at a level sufficient to effect separation into a phosphoric acid fraction and a heavy metal-bearing fraction.

20. The method of claim 19, said carbon disulfide being added at a level of up to about 10% by weight of the initially sulfided phosphoric acid.

21. The method of claim 8, including the steps of allowing said carbon disulfide treated phosphoric acid to set for a period of up to about 16 hours, prior to said recovery step.

22. In a method of removing heavy metals from phosphoric acid including the step of initially sulfiding the phosphoric acid to form heavy metal sulfides, the improvement which comprises the steps of contacting said initially sulfided phosphoric acid with a liquid extractant for said sulfides, said extractant comprising carbon disulfide, allowing the extractant-contacted phosphoric acid to set and form a phosphoric acid fraction and a sulfide-bearing fraction, and separating said fractions to recover phosphoric acid.

23. The method of claim 22, said phosphoric acid having a $P_2O_5$ content of from about 50 to 65% and being selected from the group consisting of wet process and furnace grade phosphoric acid.

* * * * *